Patented Feb. 16, 1954

2,669,515

UNITED STATES PATENT OFFICE 2,669,515

DIRECT POSITIVE EMULSIONS

John David Kendall and Henry Walter Wood, Ilford, and Stanley Frederick William Welford, Knutsford, England, assignors to Ilford Limited, Ilford, England, a British company No Drawing. Application July 21, 1952, Serial No. 300,116

Claims priority, application Great Britain August 1, 1951

7 Claims. (Cl. 95—7)

This invention relates to the production of direct positive emulsions.

In United States Patent No. 2,541,472, there is described a method of producing a direct positive emulsion in which there is incorporated in a silver chloride emulsion, which is substantially free from silver bromide or silver iodide, a proportion of a desensitising compound and the emulsion is fogged by light or chemical means. When an emulsion so produced is thereafter exposed and developed, a positive image is directly produced.

In fact, however, suitable desensitising compounds for the aforesaid process are quite rare and the said U. S. patent is restricted to compounds selected from benzthiazole, quinoline, indolenine, benztriazole and rhodanine compounds, and their alkyl quaternary salts, having a nitro group attached to a benzene nucleus.

It has now been discovered that direct positive emulsions of high quality may be produced by the general technique described in the said United States patent by employing as the desensitising compound a compound of the general formula:

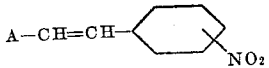

where A is a quaternary heterocyclic nucleus selected from the cinnoline and quinazoline nuclei. The said compound is included in the silver chloride emulsion in an amount from 0.1 to 2 g. of the compound per 100 gms. of silver chloride. The emulsion may be pre-fogged by exposure to light, but it is preferred to pre-fog the emulsion chemically, for example by including formaldehyde in the emulsion and allowing the emulsion to stand at elevated temperature.

The following examples will serve to illustrate the invention:

Example 1

7 litres of a photographic emulsion containing 188 g. silver chloride and adjusted to a pH of 8 were treated with 250 cc. of 10% formalin (containing 4% formaldehyde). After heating for 20 minutes at 125° F., the pH was lowered to about 6 by addition of citric acid and 0.33 g. of 4-(m-nitrostyryl)-cinnoline methotoluene p-sulphonate, dissolved in ethyl alcohol, were added. The emulsion was coated on paper.

On exposure and development the coated paper yielded a direct positive image of high quality.

Example 2

To 20.35 kilos of an unwashed gelatino silver chloride emulsion containing 700 gms. of silver chloride and 0.67 g. of silver iodide were added 11.4 gms. borax to bring the pH to 7.8; to this was added 315 ccs. of 1.0% formaldehyde solution and the emulsion then maintained for 45 minutes at 116° F. 126 ccs. of 5.0% hydroxylamine hydrochloride were then added, changing the pH to 6.25. To this amount of emulsion was added 1.32 g. of 4-(m-nitrostyryl)-quinazoline methyl p-toluene sulphonate dissolved in ethyl alcohol. The emulsion was coated on paper and gave, on exposure and development, direct reversed images of high quality.

Similar results were obtained using, instead of the stated quinazoline compound, 1.68 g. of the cinnoline compound of Example 1, or similar quantities of other compounds of the series such as the corresponding o- and p-nitro compounds, and of other quaternary salts such as the alkyl halides, alkyl sulphates, sulphonates and the like.

What we claim is:

1. A direct positive photographic element comprising a fogged gelatino silver chloride emulsion containing a desensitising compound of the general formula:

where A is a quaternary heterocyclic nucleus selected from the group consisting of the cinnoline and quinazoline nuclei.

2. A direct positive photographic element comprising a chemically fogged gelatino silver chloride emulsion containing a desensitising compound of the general formula:

where A is a quaternary heterocyclic nucleus selected from the group consisting of the cinnoline and quinazoline nuclei.

3. A direct positive photographic element comprising a gelatino silver chloride emulsion fogged by treatment with formaldehyde and containing a desensitising compound of the general formula:

where A is a quaternary heterocyclic nucleus selected from the group consisting of the cinnoline and quinazoline nuclei.

4. A direct positive photographic element comprising a light-fogged gelatino silver chloride emulsion containing a desensitising compound of the general formula:

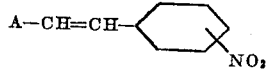

where A is a quaternary heterocyclic nucleus selected from the group consisting of the cinnoline and quinazoline nuclei.

5. A direct positive photographic element comprising a fogged gelatino silver chloride emulsion containing a desensitising compound of the general formula:

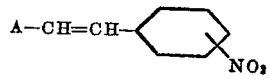

where A is a quaternary heterocyclic nucleus selected from the group consisting of the cinnoline and quinazoline nuclei, the proportion of such desensitising compound being 0.1 to 2 g. per 100 g. of silver chloride.

6. A direct positive photographic element comprising a fogged gelatino silver chloride emulsion containing 0.1 to 2 g. per 100 g. of silver chloride of 4-(m-nitrostyryl)-cinnoline methotoluene p-sulphonate.

7. A direct positive photographic element comprising a fogged gelatino silver chloride emulsion containing 0.1 to 2 g. per 100 g. of silver chloride of 4-(m-nitrostyryl)-quinazoline methotoluene p-sulphonate.

JOHN DAVID KENDALL.
HENRY WALTER WOOD.
STANLEY FREDERICK
    WILLIAM WELFORD.

No references cited.